United States Patent Office 2,786,749
Patented Mar. 26, 1957

2,786,749

METHOD OF PRODUCING STEEL IN THE SIEMENS-MARTIN FURNACE USING PRE-METAL MELTED IN THE CUPOLA FURNACE

Siegfried Tunder, Dusseldorf-Stockum, Germany, assignor to Gesellschaft für Hüttenwerksanlagen m. b. H., Dusseldorf, Germany No Drawing. Application June 22, 1955,
Serial No. 517,385

Claims priority, application Germany July 9, 1954

1 Claim. (Cl. 75—46)

This invention relates to a method of producing steel in the Siemens-Martin furnace using pre-metal melted in the cupola furnace.

In the conventional Siemens-Martin process a charge consisting of open-hearth pig and scrap is used to start with and the steel pig containing 2 to 4% of manganese is advantageously at the same time charged in the molten state. The combination: cupola furnace/Siemens-Martin furnace in which the cupola furnace provides a molten pre-metal containing 1 to 1.5% manganese is also known. Developments in recent years have led to the hot-blast operated cupola furnace, which can be neutral-lined and also basic-lined.

Exhaustive tests on the most advantageous and economically best co-operation between the cupola furnace and the Siemens-Martin furnace have now given a steel production process which allots a hot-blast operated, neutral- or basic-lined cupola furnace the task of producing a pre-melting iron which is low in manganese, silicon and sulphur, which is superheated to 1400 to 1600° C. and which, in conjunction with the fining process in the Siemens-Martin furnace, is charged in the latter only after the solid charge consisting of scrap and refining agent, such as mill scale for example, has been initially melted in a preheating period of about 10 to 20 minutes.

The premelting iron, hot-melted in the cupola furnace and low in manganese, silicon and sulphur enters, directly after the charging, into such a vigorous reaction with the solid charge of the Siemens-Martin furnace that a surprisingly rapid and extensive combustion of the carbon is brought about and the charge runs in with a lower carbon content than is otherwise the case. The slag is also made to foam vigorously by the violent fining reaction and hence the dephosphorization of the charge is accelerated. Altogether, this method of operation leads to a considerable reduction in the charging period and hence to an unexpected increase in output of the Siemens-Martin operation.

The essential features of the method of the present invention are accordingly the production of a very hot cupola furnace premelting iron of low manganese, silicon and sulphur content in a hot-blast operated neutralor basic-lined cupola furnace, and the charging of this premetal only after the solid charge of the Martin furnace is heated up and initially melted.

A cupola furnace premelting iron of the following composition has proved particularly advantageous for the hereindescribed method:

| | |
|---|---|
| Carbon | 2.5 to 3.8% |
| Silicon | 0.05 to 0.30% |
| Manganese | 0.10 to 0.50% |
| Sulphur | 0.02 to 0.08% |
| Phosphorus | 0.08 to 0.2% |
| Remainder | iron and the usual accompanying substances |

I claim:

A method of producing steel in an open-hearth furnace which comprises initially melting in said furnace, for a period of between 10 and 20 minutes, a charge comprising scrap and finding agent, thereafter introducing into said initially molten charge a molten pre-iron produced in a hot-blast operated cupola-furnace, said charge containing:

| | |
|---|---|
| Carbon | 2.5 to 3.8% |
| Silicon | 0.05 to 0.30% |
| Manganese | 0.10 to 0.50% |
| Sulfur | 0.02 to 0.08% |
| Phosphorus | 0.08 to 0.2% |
| Remainder | iron and the usual accompanying substances | and thereupon continuing and finishing the refining of the charge in said open-hearth furnace.

References Cited in the file of this patent

UNITED STATES PATENTS 837,598     Weaver et al.     Dec. 4, 1906

OTHER REFERENCES

The Making, Shaping, and Treating of Steel (Camp and Francis), published by Carnegie-Illinois Steel Corp. (Pittsburgh), 1940 (pages 385 and 411 relied on).